United States Patent [19]

Varde et al.

[11] Patent Number: 5,021,519
[45] Date of Patent: Jun. 4, 1991

[54] EPOXY-POLYIMIDE BLEND FOR LOW TEMPERATURE CURE, HIGH-PERFORMANCE RESIN SYSTEM AND COMPOSITES

[75] Inventors: Uday M. Varde; Michael N. Tackie, both of Plum Borough, Pa.; Rakesh K. Gupta, Fairborn, Ohio

[73] Assignee: Aluminum Company of America, Pittsburgh, Pa.

[21] Appl. No.: 173,245

[22] Filed: Mar. 24, 1988

[51] Int. Cl.$^5$ .............................................. C08L 79/08
[52] U.S. Cl. ................................... 525/423; 525/421; 525/530; 525/903; 526/262; 528/94; 528/117; 528/322; 428/163; 428/252; 428/408; 428/473.5
[58] Field of Search ................ 526/262, 421; 525/422, 525/530, 903, 423; 528/322, 94, 117

[56] References Cited

U.S. PATENT DOCUMENTS

| | | | |
|---|---|---|---|
| 4,316,002 | 2/1982 | Cassat et al. | 525/422 |
| 4,393,188 | 7/1983 | Takahashi et al. | 525/422 |
| 4,401,777 | 8/1983 | Tsuboi et al. | 525/422 |
| 4,510,272 | 4/1985 | Loszewski | 525/530 |
| 4,557,860 | 12/1985 | DiSalvo et al. | 525/423 |
| 4,654,407 | 3/1987 | Domeier | 526/262 |
| 4,761,460 | 8/1988 | Otsuka et al. | 525/530 |

*Primary Examiner*—Ana L. Carrillo
*Attorney, Agent, or Firm*—Glenn E. Klepac; Alfred D. Lobo

[57] ABSTRACT

A non-elastomeric epoxy having a mol wt less than about 10,000 and curing agent therefor ("epoxy-curing-agent"), both of which (epoxy/epoxy-curing-agent) are liquid while at curing temperatures, provide a continuous liquid phase in which a polyimide (PI) generally, and a bisimide (BI) in particular, may be homogeneously dispersed to form a fluidized dispersion. In one embodiment, the less viscous epoxy/epoxy-curing-agent is the dispersive medium (continuous phase) and the PI the dispersed or discontinuous phase. In the more preferred embodiment, the epoxy/epoxy-curing-agent and PI are miscible, forming a single liquid phase in which the PI is homogeneously dispersed. In each embodiment, the epoxy is essentially unreactive with the PI. Upon curing the epoxy in a first stage, to form a polymeric epoxy matrix (also referred to as "cured epoxy resin" herein) at a temperature below 150° C., which is below that at which the PI cures, the cured epoxy matrix provides a stable three dimensional framework in which the PI is homogeneeously dispersed. Subsequently, in a second stage, the PI is cured, optionally with a curing agent for the PI ("PI-curing-agent"), at a sufficiently high temperature to crosslink the PI, but below that at which the cured epoxy matrix is degraded. The cured resin blend so obtained has an essentially continuous (more than 5000 hr) service temperature above 176° C. (350° F.). For the PI to cure, it must be present in an amount sufficient to ensure molecular proximity of the PI molecules, or PI/PI-curing-agent molecules, sufficient for interaction therebetween. The cured resin blend is preferably post-cured in a composite at a temperature above 176° C. but below that at which the cured epoxy matrix loses 50% of its physical and mechanical properties.

18 Claims, 2 Drawing Sheets

EPOXY-POLYIMIDE BLEND FOR LOW TEMPERATURE CURE, HIGH-PERFORMANCE RESIN SYSTEM AND COMPOSITES

BACKGROUND OF THE INVENTION

This invention relates to an essentially solvent-free resin blend and advanced composites for substantially continuous use at a service temperature of at least 176° C. (350° F.) which is above that of known cured epoxy resin systems. By "essentially solvent-free" I refer to a negligible amount of solvent, typically less than 1 percent, and most preferably less than 0.01 percent by weight of the resin. Advanced composites are used chiefly in structures such as supersonic military aircraft, engine nacelles, and missile applications, because of the high specific strength and modulus of the composites. These structures are required to withstand long (several thousand hours) exposure to temperatures in the 121°–232° C. (250°–450° F.) range, and brief exposure (several minutes or less) to temperatures up to 260° C. (500° F.).

The composites are typically composed of graphite or boron fibers, embedded in a polymeric matrix. Less advanced composites used in industry are composed of glass fibers and may not require as high a service temperature for as long a time. The polymer matrix determines the useful limits of the composites; whether they can be made economically depends upon their improved processing characteristics. Their commercial utility depends upon their superior toughness and high resistance to damage from moisture, or stress, or impact, or radiation. Currently, the epoxies are mainly used because of their processability, but they lack adequate qualifications for high temperature performance as well as adequate resistance to moisture. Currently used resin systems which cure at relatively low temperature, such as the diglycidyl ether of bisphenol-A/metaphenylene diamine (DGEBA/mPDA), cannot be used above 121° C. (250° F.).

In the specific field of "cocured" composites, reinforcing fibers impregnated with uncured resin are conformed to a preselected structural configuration and then cured. This technique may be used either to produce a complete article of arbitrary shape, or to repair a composite structure. Cocured resins are generally of low viscosity to enable them to penetrate and wet the fiber bundles. At the present time, we know of no resin which will meet the optimum criteria for a cocured resin. In particular, the inability of known resins and resin blends to maintain stiffness (in terms of shear modulus) and/or strength at temperatures much above the cure temperature, is the primary factor limiting fabrication of structural forms at low temperature, and utilizing relatively low energy, and limiting composite repairs.

There is a need for a low energy, rapid curing matrix/adhesive for fabrication of composites and for structural repair, particularly in the field of manufacture of aircraft frames reinforced with graphite fibers, and high-performance automobiles reinforced with glass fibers. Since polymerization does not proceed rapidly in the glassy state, it is not obvious how one can cure a material, particularly a resin system containing a polyimide (referred to herein as "PI" for brevity), at a relatively low temperature below about 150° C. (302° F.), yet produce a cured resin blend with a service temperature above 200° C. (392° F.). Specifically, if such a cure was proffered, it would need effectively to provide the requisite thermomechanical properties, yet be relatively insensitive to moisture.

This invention is particularly related to resin systems comprising an epoxy and an aromatic, heterocyclic, or aliphatic PI, and bisimide ("BI" for brevity) in particular. Since, in practice, the BIs are by far of greatest interest, reference hereafter will be made to BIs, it being understood that the invention applies equally to trisimides, tetraimides, and other polyimides, as long as they meet the criteria set forth in particular for the BIs. The particular BI of interest in the resin blend will depend upon the specific thermomechanical properties desired, and the elevated temperature at which the cured resin blend is expected to retain the desired properties. Aliphatic BIs generally produce cured blends for relatively low temperature service, the heterocyclic BIs and aromatic BIs producing cured blends for relatively high temperature service.

This invention is more specifically related to miscible blends of aromatic and/or heterocyclic BIs with epoxies which are known to provide relatively high temperature service (for an epoxy) in the range from about 150° C. (302° F.) to about 250° C. (482° F.) though they have an unacceptable moisture gain. The aromatic and/or heterocyclic BIs contribute high temperature stability with lower moisture gain, preferably substantially none at all.

Epoxy resins in which the monomer contains glycidyl chain ends in a polyarylene backbone have been cured with diaminodiphenylsulfone (DDS) to provide even a higher degree of cure than with tetraglycidylmethylenedianiline (TMGDA) at room temperature or slightly elevated temperature, preferably below 120° F., but such cured epoxies have an unacceptably high sensitivity to moisture. They also have a lower service temperature than aromatic and/or heterocyclic BIs, and, bismaleimides (BMI), in particular.

BI resins exhibit excellent humidity resistance and have continuous use temperatures above 177° C. (350° F.). However they have long gel and cure times even at high curing temperatures in excess of 200° C. (475° F.). When used with graphite fiber, the composites have a high modulus but exhibit severe microcracking after cure, due to shrinkage caused by gelation at high temperatures. When cured with a solvent, they exhibit an unacceptable solvent retention problem which mandates a solvent-free system.

When a BI is chain extended by adding an aromatic linkage across the maleimido double bond to introduce an aliphatic secondary amine bridge, this reaction increases the molecular weight (mol wt) of the bisimide precursor and introduces a point of flexibility. One then observes easier processability, lower melting point, better solubility in solvents for BI, more controlled viscosity and reduced cured rate for better reaction control. However, where one wishes to use a wax mandrel in a lost wax molding process, the temperature of cure of the chain extended BI is still too high (that is, above the melting point of the wax). The wax runs out before the resin is cured. Such a chain extended resin is commercially available as Keramide 601 which is purportedly good for continuous service at 150° C. However the presence of the Michael addition product introduces a point of thermal instability in the imide chain which suppresses thermal stability.

Another chain extended BI is M-751 in which the BI prepolymer is chain extended by increasing the chain length of the diamine by the reaction of p-phenylene diamine with m-aminobenzoic acid. In addition, the prepolymer is further extended by including an equimolar amount of an amineterminated maleimide which also reacts in situ by Michael addition. This so-called "eutectic" mixture increases mol wt, reduces the melting point, increases viscosity, and moderates the reactivity of the maleimido double bond during processing. But this chain extended BI has several points of instability (see "Bismaleimides and Related Maleimido Polymers as Matrix Resins for High Temperature Environments" by John Parker, et al. NASA, Ames Research Center in Proceedings of a conference held at NASA Lewis Research Center, Cleveland, OH. Mar. 16–18, 1983).

If the melting point of the wax is not a consideration in the preparation of a prepreg (fibers impregnated with the resin), the viscosity of known chain-extended resins at the curing temperature is so low, that the prepreg cannot hold the resin. In other words, a prepreg loses the low melting point chain-extended BI resin at the curing temperature, because the resin flows out of the prepreg before it is cured.

A solution to this problem by using a low temperature curing crosslinking agent, namely divinyl benzene, for the BI is taught in U.S. Pat. No. 4,351,932 to Street, et al. To combat the problem of too low a viscosity they add a trifunctional curing agent, also for the BI, to improve tackiness and provide a higher crosslinking density so as to make up for the disadvantages of using the divinylbenzene. To reduce microcracking they included a small amount of elastomers. Specifically, polyether sulfones and bisphenol epoxies having molecular weights from 40,000 to 120,000 have been used in an amount of 0.5 to 3% by weight, without regard for their effect in the morphology of the mixture formed. The elastomer remains dispersed within the matrix resin before the resins are cured, and to preserve the elastomeric contribution, no crosslinking agent for the epoxy ("epoxy-curing-agent") is either suggested, or used. Clearly, there is no indication that the epoxy may be cured first, and it is evident that the curing of the epoxy depends upon the temperature at which the prior art N,N'-bisimide was cured. Most of all, there is a clear emphasis on the elastomeric contribution demanded of the polyether sulfone or epoxy resin, mandating their molecular weight.

We prefer not to chain extend the BI so as to avoid the points of thermal instability produced by the Michael addition product. To get better viscosity control of the epoxy/epoxy-curing-agent as the dispersive phase, and preferably, better miscibility with the BI, and, optionally a curing agent for the BI (BI-curing-agent), we prefer to chain extend the viscous epoxy molecules with a reactive diluent ("epoxy-reactive diluent"). Of course, if the epoxy is not excessively viscous at the curing temperature of the blend, it will require no reactive diluent. Though the chain extended product of the epoxy would also be subject to analogous points of thermal instability, we reasoned that the sacrifice in thermal properties of the epoxy would not affect those of the BI, particularly if there is no direct coreaction of the epoxy groups and the BI; and, the higher the proportion of BI relative to the epoxy, the less significant would be any loss attributable to the instability of the epoxy. If the epoxy/epoxy-curing agent/BI/BI-curing-agent system still lacks adequate fluidity, a reactive diluent for the BI ("BI-reactive diluent") may be added, with the expected penalty in high temperature performance properties.

We deliberately use an epoxy which is non-elastomeric, and which must be crosslinked after it forms a fluidized dispersion, or, more preferably, a single phase of liquid epoxy/epoxy-curing-agent and an aromatic BI which is liquid at the curing temperature of the epoxy in our resin system. To form the single phase in our solvent-free resin system, it is essential that the proportions in which the relatively low mol wt epoxy, and, the aromatic BI be such that the epoxy and BI are mutually miscible at, or below, the curing temperature of the epoxy; and, preferably, the epoxy-reactive diluent, and BI-reactive diluent (if either, or both, is used), are both mutually miscible, and, each miscible in the epoxy/epoxy-curing-agent/epoxy-reactive diluent/BI blend, so as to form a single liquid phase. A single liquid phase is formed when there is no visual demarcation between the components in the liquid phase.

It is not essential that the epoxy, the epoxy-curing-agent, and the epoxy-reactive diluent, form a single liquid phase with the BI, but it is essential that the BI be homogeneously dispersed, whether the BI is a finely divided powder, or a liquid at or below the epoxy curing temperature. It will be evident that the components of the uncured resin system will be homogeneously distributed if they are mutually miscible. In those instances where the end use of the cured epoxy/BI resin can tolerate the uncertainties of dealing with the removal of moisture generated with an amine curing agent for the BI, a tetracarboxylic acid dianhydride, preferably one in which the tetravalent radical is aromatic or heterocyclic, may be used. However, in those instances where no water is to be generated, the BI, or the BI with BI-reactive diluent is thermally cured without the evolution of moisture.

We are aware of nothing in the prior art teaching that an essentially solvent-free, liquid, low mol wt epoxy, flowable under processing conditions, and curable with a curing agent at a temperature below 150° C. (302° F.) should be used as the dispersive (continuous) phase in which a BI is the discontinuous phase; or, that the epoxy and epoxy curing agent should be miscible with the BI, and optionally with a BI curing agent, at a temperature lower than that required to cure the BI; so that the epoxy, upon being cured can "fix" the homogeneously dispersed BI which may be cured later, simply by heating to a higher temperature than the curing temperature for the epoxy, without generating volatiles at any stage.

SUMMARY OF THE INVENTION

It has been discovered that a non-elastomeric epoxy having a mol wt less than about 10,000 and curing agent therefor ("epoxy-curing-agent"), both of which (epoxy/epoxy-curing-agent) are liquid while at curing temperatures, provide a continuous liquid phase in which a polyimide (PI) generally, and a bisimide (BI) in particular, may be homogeneously dispersed to form a fluidized dispersion. In one embodiment, the less viscous epoxy/epoxy-curing-agent is the dispersive medium (continuous phase) and the PI the dispersed or discontinuous phase. In the more preferred embodiment, the epoxy/epoxy-curing-agent and PI are miscible, forming a single liquid phase in which the PI is homogeneously dispersed. In each embodiment, the epoxy is essentially unreactive with the PI.

It has further been discovered that in a resin system with the foregoing characteristics, upon curing the epoxy in a first stage, to form a polymeric epoxy matrix (also referred to as "cured epoxy resin" herein) at a temperature below 150° C., which is below that at which the PI cures, the cured epoxy matrix provides a framework in which the PI is homogeneously dispersed. Subsequently, in a second stage, the PI is cured, optionally with a curing agent for the PI ("PI-curing-agent"), at a sufficiently high temperature to crosslink the PI, but below that at which the cured epoxy matrix is degraded. The cured resin blend so obtained has an essentially continuous (more than 5000 hr) service temperature above 176° C. (350° F.) For the PI to cure, it must be present in an amount sufficient to ensure molecular proximity of the PI molecules, or PI/PI-curing-agent molecules, sufficient for interaction therebetween. The cured resin blend is preferably post-cured at a temperature above 176° C. but below that at which the cured epoxy matrix loses 50% of its physical and mechanical properties.

It is therefore a general object of this invention to provide a cured blend of an epoxy resin and a PI (referred to herein as an epoxy/PI blend) in a two-stage process, comprising, in a first stage, curing a solvent-free fluidized dispersion of a PI homogeneously dispersed in a non-elastomeric liquid epoxy, with an epoxy-curing-agent present in an amount sufficient to crosslink the epoxy forming a cured epoxy matrix, at a temperature sufficiently high to cure the epoxy to the substantial exclusion of the PI; and, in a second stage, curing the PI, optionally with a PI-curing-agent, at a temperature sufficiently high to crosslink the PI, but lower than that at which the physical properties of the cured epoxy resin in the blend are deleteriously affected.

It has also been discovered that the viscosity of an epoxy having a desirably high service temperature may be decreased so as to be flowable at, or below, the curing temperature of the epoxy, if it is diluted with a reactive diluent which has the effect of chain coupling, or, chain extending the epoxy, essentially without co-reacting with the PI at the curing temperature of the epoxy.

It has more particularly been discovered that an aromatic diamine may be used to cure the epoxy in a solvent-free, single phase liquid resin system containing a PI, at a temperature below about 150° C. (302° F.) substantially without crosslinking the PI, and thereafter, in a second stage, the PI may be thermally crosslinked, optionally with a coreactive diluent for the PI, and/or a PI-curing agent, so that there is no evolution of volatiles.

It has specifically been discovered that a homogeneous resin blend of (i) a class of tetraglycidyl polyarylene epoxy resins, (ii) a monoaminoarylene reactive diluent such as an aminophenylacetylene (APA), for the epoxy, and, (iii) a polyarylene polyether bismaleimide, or, a polyarylene polythioether bismaleimide (PAPE-BMI), forms a single liquid phase because, in the proportions in which they are used, the epoxy, the epoxy-curing-agent and reactive diluent for the epoxy, and the PAPE-BMI are mutually miscible at or below the curing temperature of the epoxy. The curing characteristics of the epoxy allow a low enough temperature cure so that the epoxy, curing in a first stage, at a temperature preferably below about 49° C. (120° F.), provides a polymeric epoxy matrix having a sufficiently high viscosity to "fix" the distribution (locations) of the PAPE-BMI molecules homogeneously distributed within the matrix. The concentration of these PAPE-BMI molecules in the curing or cured epoxy matrix, is such that the chain ends of the PAPE-BMI "find each other"; and, in a second stage of curing at a higher temperature in the range from about 49° C. (120° F.) to 177° C. (350° F.), the chain ends of the PAPE-BMI molecules are crosslinked to form a cured blend. At, or above the second stage curing temperature, pendant ethynyl groups are crosslinked to further enhance the temperature stability of the cured blend.

The most preferred epoxies are the commercially available resins EPON® HPT 1071, said to be N,N,N',N'-tetraglycidyl-α, α'-bis(4-aminophenyl)-p-diisopropylbenzene; and HPT 1072 said to be N,N,N',N'-tetraglycidyl-α, α'-bis(3,5-dimethyl-4-aminophenyl)-p-diisopropylbenzene; both from Shell Chemical Company.

The most preferred aromatic PAPE-BMI is a polyphenylene ether bismaleimide typified by a low melting 1H-pyrrole-2,5-dione,1,1'-[1,3-phenylene bis(oxy-3,1-phenylene)], also named N,N'-m-phenylene bis(oxy-di-m-phenylene)]bismaleimide (APB-BMI).

It has specifically been discovered that blending the specified epoxies and conventional curing agents therefor, with APB-BMI and 3-aminophenylacetylene (3-APA), allows a surprisingly close match of coefficients of thermal expansion of the cured resin blend and graphite reinforcing fibers, which close match reduces the tendency to form microcracks. Because the epoxy cures at low temperature in the first stage, the curing of the APB-BMI in the second stage may be effected at a lower than normal temperature in the curing range for the APB-BMI, thereby reducing stress between the fiber and the matrix resin blend. The specific reactive diluent used, and the amount added is chosen to provide the desired cure as well as to provide the desired lower temperature cure.

It is therefore a specific object of this invention to provide fiber reinforced composites of arbitrary shape preferably utilizing glass, boron, or graphite fibers, for structural parts of aircraft and other vehicles where the strength to weight ratio is of predominant concern; for example, in a fluted core structure consisting essentially of multiple longitudinal half-pipe folds of reinforced graphite fabric sandwiched between laminar sheets of reinforced graphite fabric, the structure produced by the lost wax molding process; and, in honeycomb structures.

BRIEF DESCRIPTION OF THE DRAWING

The foregoing and other objects and advantages of our invention will appear more fully from the following description, made in connection with the accompanying drawings of a preferred embodiment of the invention, wherein.

DETAILED DESCRIPTION OF PREFERRED EMBODIMENTS

In its general application, this invention provides a polyimide-containing resin system curable at relatively low temperature, and eliminating the need for a solvent. In its best mode, the resin system avoids chain extension of the polyimide (PI); the resin system relies on the choice of an epoxy and epoxy-curing-agent which will not yield a cured epoxy having so low a service temperature as to be at cross purposes with the choice of PI as a component of the resin system. In other words, since the presence of the PI is dictated by the requirement of service at a relatively higher temperature than that for most epoxy resins, this invention, in a preferred embodiment, is specifically concerned with epoxy resins which are liquid at a temperature below that at which they are cured, and when cured without being blended, will provide a service temperature of at least about 100° C. (212° F.).

The more effective the epoxy and epoxy-curing-agent as the dispersive medium for the PI, the less epoxy required and the more PI can be dispersed, and the higher the contribution of the PI to elevated service temperature performance of the blend. For the same concentration of different PIs in two blends with the same epoxy and curing agent, the blend containing the PI with a higher melting point will provide the higher service temperature. Since aliphatic PIs are notably low melting compared with aromatic and heterocyclic PIs, further reference to PIs in the best mode of this invention will be to aromatic and/or heterocyclic PIs which have a melting point above about 150° C. (302° F.), and which when crosslinked without a diluent for the PI, or a coreactant for the PI, or when being blended, does not degrade unacceptably below about 300° C. (572° F.).

The cured resin blend of the invention is produced in a two-stage cure of a resin system which comprises (i) a non-elastomeric epoxy present in an amount preferably at least 5 per cent by weight (% by wt) of the resin system, and more preferably less than an equal amount by weight (of epoxy) relative to the aromatic PI to be used; (ii) a curing agent for the epoxy present in an amount sufficient to cure the epoxy, the curing agent being miscible with the epoxy at the temperature at which the epoxy is cured, and (iii) an unsaturated aromatic PI homogeneously distributed and held in place or "fixed" in the resin blend as the epoxy cures in a first curing stage; thereafter, in a second stage of cure, the aromatic PI is thermally cross-linked and cured. The cured blend may be post-cured, if desired.

It is preferred that the epoxy be present in a minor amount from about 10 to about 40% by wt in the resin system, the lower limit being determined by the ability of that amount of the particular epoxy to "fix" the homogeneous distribution of the aromatic BI in the epoxy matrix. Since the high performance epoxy resins most desirably used in the resin system are not fluid enough at a desirable curing temperature in the range from about 20° C. (68° F.) to about 150° C. (302° F.) they are mixed with a reactive diluent for the epoxy ("epoxy-reactive diluent") in an amount sufficient to give the epoxy and conventional epoxy-curing-agent adequate fluidity for the intended purpose.

A preferred curing agent is an aromatic polyamine having at least 3 active hydrogen atoms per molecule, and the amount of said curing agent is such that there are about 0.75 to about 1.25 amine hydrogen equivalents for each epoxy group.

In the specific instance where the resin system is to be used for "potting" applications, it is sufficient that the viscosity of the resin system be low enough to fill the potting cavity in a reasonable time, and a viscosity lower than about $1 \times 10^5$ cp, preferably lower than about 10,000 cp, at the curing temperature of choice for the epoxy, will suffice. For such applications, the PI may be distributed in the epoxy/epoxy-curing-agent as a finely divided particulate powder with a U.S. standard mesh size smaller than about 325 mesh (44 microns), present in a sufficiently high concentration to permit particle-to-particle contact of a sufficiently large number of particles to provide a crosslinked PI network. It will be evident that the higher the concentration of the PI particles, the higher will be the viscosity of the fluid dispersion, and the higher will be the proportion by weight of the epoxy-reactive diluent to provide a fluent resin system.

In the specific instance where the resin system is to be used for "prepreg" applications, it is sufficient that the viscosity of the resin system be low enough to wet the fibers and fill the voids therebetween sufficiently, and in a reasonable time, to give the desired thermomechanical properties. Further, for impregnation of plural layers of fibers it is preferred to use a liquid phase formed by the components of the resin system which are miscible. Thus, for impregnating fiber reinforced composites, the resin system has a viscosity lower than about $1 \times 10^4$ cp, preferably lower than about 5000 cp, at the curing temperature of choice for the epoxy. For such applications, the PI is distributed in the epoxy/curing agent as a miscible liquid present in a sufficiently high concentration to permit the chain ends of of a sufficiently large number of PI molecules to "find" each other under thermal crosslinking conditions. It will be evident that the higher the concentration of the PI molecules, the higher will be the viscosity of the single liquid phase of mutually miscible resin components, and the higher will be the proportion by weight of the epoxy-reactive diluent to provide a fluent enough resin system.

The essential function of the epoxy/epoxy-curing-agent/epoxy-reactive diluent mixture is to provide a stable three-dimenisonal structure after the epoxy is cured, so that the PI particles or molecules have essentially no tendency to migrate within the resin blend. The choice of epoxy and the choice of PI within the limits of the functions of each, provides the ability to tailor the cured resin blend, and composites made therewith, for both transverse strength and impact.

Where the resin system is for a potting application, or is to be reinforced with short fibers less than about 1 cm long and less than 100 microns in diameter, a powder PI may be used if it is homogeneously dispersed in the epoxy/-epoxy-curing-agent/epoxy-reactive diluent mixture, provided the concentration of PI particles meets the criterion set forth hereinabove.

Though the most commonly used PIs are bisimides (BIs) described herebelow, some tri- and tetrafunctional PIs may also be used.

Where the relative thermal instability of a chain-extended Michael-addition product is not objectionable, a reactive diluent for the PI (PI-reactive diluent) may be used. The choice of such PI-reactive diluents from among those known in the art depends on which is miscible in the epoxy/epoxy-curing-agent/PI mixture and may be arrived at by a little simple trial and error such as one skilled in the art is accustomed to do.

Preferred PIs are the BIs, described hereinbelow, amongst which the aromatic BIs are most preferred for their high temperature performance characteristics.

Though the order of addition of the components of the resin system is not narrowly critical, the epoxy, epoxy-curing-agent and epoxy-reactive diluent are mixed to form a first mixture; the BI is then mixed into the first mixture to produce the desired viscosity. In practice, at least 10% by wt of the epoxy-reactive diluent (based on the wt of the epoxy) is used, and preferably from about 15 to 40% by wt, but not so much as will adversely affect the high temperature physical properties of the cured polymer blend.

Reactive diluents for the epoxy are typically aliphatic diols; divinyl-arylene compounds such as divinylbenzene; and bis-allylphenyl isopropylidene, and monoaminoarylacetylenes, or mono- or diethynyl-terminated monoaminoarylene oligomers, or diethynyl benzene, or a polyarylene oligomer having ethynyl end groups, any of which diluents having vinyl and/or ethynyl unsaturation, may be used alone, or in combination with each other. Since each tends to vitiate the contribution of the PI to high temperature performance of the cured resin blend, it will be evident that only as much reactive diluent is used as will effectively distribute the PI in the epoxy which is most preferably present in a minor amount by weight relative to the PI in the blend; and the reactive diluent is most preferably present in a minor amount by weight relative to the amount of epoxy resin in the blend.

The preferred reactive diluent is a monoethynyl (or monoacetylenyl) terminated monoaminoaryl compound, or oligomer represented by the formula H$_2$N—Ar—C≡CH wherein Ar represents phenyl, alkylphenyl, naphthyl, alkylnaphthyl, each having from 6 to about 20 carbon atoms, or a predominantly aromatic and/or heterocyclic chain having from 3 to about 10 rings interconnected with a single C, O or S atom, for example a polyphenylene polyether chain. The ethynyl terminated monoaminoaryl compound, or oligomer, is preferred because it serves the dual purpose of coupling two epoxy groups with a single N atom at or below the curing temperature of the epoxy, and providing a reactive ethynyl group for reaction with the C=C double bond of the PI at or below the curing temperature for the PI. The coupling of plural epoxy groups with plural N atoms, one N atom for every two epoxy groups, provides plural ethynyl groups to crosslink the imide groups of the PI molecules, thus:

wherein, R represents that portion of the epoxy molecule between oxirane end groups,
Ar represents a predominantly aromatic moiety, and,
n represents an integer in the range from 2 to about 20.

Most preferred is an aminophenylacetylene having the structure which couples 1,2-epoxy groups forming a chain represented by the structure In addition, pendant ethynyl groups may be crosslinked at or above the curing temperature of the PI. The structure of the epoxy resin used is not narrowly critical, though it will be apparent that the physical properties of the cured resin blend will be affected not only by the structure of the particular epoxy used, but also by the amount of the epoxy. Most preferred are the multifunctional 1,2-epoxies containing aliphatic, cycloaliphatic, aromatic and heterocyclic backbones. Among these are the epoxy cresol novolac (ECN) resins defined by the structure [37382-79-9], the epoxy phenol novolac (EPN) resins having from 2.2 to more than 5 epoxy groups per molecule defined by the structure [9003-35-5], the bisphenol F resins, the polynuclear phenol-glycidyl ether-derived resins defined by structure [27043-37-4], aromatic and heterocyclic polyglycidyl amine resins, particularly the tetraglycidylmethylenedianiline-derived resins defined by the structure [28768-32-3], triglycidyl-p-aminophenol derived resins, triazine-based resins, and the hydantoin epoxy resins.

Most preferred are the multifunctional resins derived from polyglycidyl amines which have reduced water absorption, for example triglycidyl p-aminophenol-derived resins; N,N,N',N'-tetraglycidyl 4,4'-diaminodiphenylmethane; 1,3,5-triglycidyl isocyanurate; and the N,N,N',N'-tetraglycidyl 4,4'-bis(aminodiphenyl)-p-isopropylbenzene resins.

The tetraglycidylamine based epoxy resins have the general structure:

wherein Z represents a chain of at least three phenyl or substituted-pheny rings connected with gem-dialkyl (say, isopropyl) or gem-dihaloalkyl (say, isofluoropropyl) groups, preferably where alkyl is $C_1$–$C_3$ lower alkyl.

Most preferred are the EPON HPT 1071 and 1072 resins available from Shell Chemical Company.

The structure of the aromatic BI monomer or oligomer (having from about 2 to about 20 repeating units) used, is not narrowly critical, though it will be apparent, as with the epoxy resin, that the physical properties of the cured resin blend will be affected not only by the structure of the particular BMI used, but also by the amount of the BMI. The general structure of the BMI may be represented as:

wherein,
- Y represents a divalent radical of at least 2 carbon atoms, preferably 2 to 6 C atoms, containing a C=C double bond, and,
- Z' is a divalent aliphatic, cycloaliphatic, aromatic or heterocyclic radical containing at least 2 C atoms and generally less than 30 C atoms.

Y is typically derived from an ethylenic acid or anhydride such as maleic, citraconic, itaconic, tetrahydrophthalic, and the products of a Diels-Alder reaction between a cyclodiene and one of the anhydrides.

Z' more particularly represents linear or branched chain alkylene radicals having less than 13 carbon atoms, cycloalkylene radicals having 5 or 6 ring carbon atoms, heterocyclic radicals containing at least one of the atoms O, N, S, or a phenylene or polycyclic aromatic radical. Any of the foregoing radicals may carry inert substituents, that is, substituents which do not give undesired side-reactions under processing conditions. Z' may also represent one or more phenylene or alicyclic radicals connected directly by a valency bond, or by an atom or group which is inert under processing conditions, such as for example, —O—, —S—, an alkylene group having 1 to 3 C atoms, or one of the groups —$NR_2$—, —$P(O)R_1$—, —N=N—, —CO—O—, $SO_2$—, —$SiR_1R_2$—, —CONH—, —NR—CO—X—CO—NR—, —O—CO—X—CO—O—, which
- R, $R_1$, and $R_2$ each represent $C_1$–$C_4$ alkyl, cycloalkyl having 1 to 4 ring C atoms, phenyl, or a polycyclic aromatic radical, and,
- X represents straight or branched chain alkylene having less than 13 C atoms, cycloalkylene having 5 to 6 ring C atoms, or a mono- or polycyclic arylene radical.

Representative N,N'-bisimides which may be employed are the N,N'-bismaleimides of ethylene diamine, hexamethylene diamine, phenylene diamine, tetramethyl-hexamethylene diamine, methylene dianiline, toluene diamine, 4,4'-diphenylmethane diamine, 3,3'-diphenylsulfone diamine, 4,4'-diphenylether diamine, 4,4,'-diphenylsulfone diamine, 4,4'-dicyclohexanemethane diamine, 4,4'-diphenylcyclohexane diamine, metaxylylene diamine, and mixtures thereof. Other N,N'-bisimides and processes for their preparation are described in U.S. Pat. Nos. 3,562,223, 3,627,780, 3,839,358 inter alia the disclosures of which are incorporated by reference thereto as if fully set forth herein.

Preferred N,N'-bisimides are those having melting points above 176° C. (350° F.) derived from at least one aromatic diamine, since resins based on imides of aromatic diamines have higher temperature stability than those based on aliphatic or cycloaliphatic diamines. Most preferred are polyarylene polyether bismaleimides such as APB-BMI having the structure:

and mixed arylene-cycloaliphatic BMIs such as STI-BMI having the structure:

Me = methyl

If desired, the may include a diunsaturated crosslinking agent (BI-curing-agent), unreactive with the epoxy at or below the first stage curing temperature, yet capable of addition polymerization crosslinking reaction with the bisimide at a temperature above that of the first stage curing temperature. Preferred materials are aryl compounds containing two vinyl groups such as divinyl benzene and O,O'-diallylbisphenol A.

The resin blend of this invention is utilized neat, that is, without a solvent. The neat resin system is applied as a blend of epoxy/epoxy-curing-agent/epoxyreactive diluent/BI at a temperature in the range from about 10° C. to 50° C. to fiber reinforcement such as carbon, Kevlar ® aramid fibers, Kuralon ®, graphite or glass filament, fiber or cloth to form a prepreg, in an amount from about 20% to about 50% by weight of resin solids, usually 25% to 40% by weight based on the weight of the prepreg. The resin system is advanced to a partially solid cured state by heating the resin to a temperature below about 100° C. (212° F.) in a first stage cure; then heating to a temperature sufficient to cure the N,N'-bisimide, preferably from about 121° C. to 176° C. (250° F. to 350° F.) for from about 1 to 10 hours. The cured resin blend in the prepreg is desirably post-cured at a temperature above about 350° F. (176° C.) but below about 500° F. (260°) for from 1 to about 20 hours. If desired, fillers, pigments and dyes may be included in the blend.

A typical procedure for forming a composite is to apply the uncured resin to undirectional woven graphite to form a prepreg tape. Multiple plies of the prepreg tape are laid up in a single direction, or, cross-direction and are placed in an autoclave and heated under pressure of 50 psi to 150 psi at a temperature of 66° C. to 150° C. (150° F. to 302° F.) for 2 to 5 hours followed by a free-standing post cure in an oven at a temperature from 232° C. to 316° C. (450° F. to 600° F. for about 2 to 10 hours.

In the following illustrative examples, all reference to "parts" refer to parts by weight unless otherwise specified.

Example 1

A. 100 parts TGMDA (tetraglycidylmethylenedianiline), and 30 parts MPDA are thoroughly mixed at room temperature (about 20° C.) to form a first mixture to which is added 500 parts of APB-BMI with continued mixing and without heating, so as to form a homogeneous second mixture in which the TGMDA/MPDA/APB-BMI are present as a single phase. This second mixture is then warmed to about 150° C. (302° F.) and allowed to cure, forming a solid mass in which the APB-BMI is homogeneously distributed without being substantially crosslinked. The solid mass is then placed in an autoclave and the temperature raised to 190° C. (374° F.) and held at this temperature for 1 hour. The shape of the solid mass is substantially retained and the APB-BMI is found to be essentially completely crosslinked, without evidence of TGMDA bleeding to the surfaces.

In an analogous manner, cured resin blends are formed with diglycidyl ethers of bisphenol A; epoxy cresol novolac resins; epoxy phenol novolac resins such as D.E.N.439 (Dow Chemical); bisphenol F resins; triglycidyl-p-amino-phenol-derived resins; triazine-based resins; hydantoin epoxy resins; difunctional cycloaliphatic epoxy resins; and, various polynuclear phenolglycidyl ether-derived resins, each of which is a liquid below 150° C. and is cured in the range from about 50°–121° C. (120°–250° F.) with a curing agent which may be a a catalytic curing agent, which is also a liquid below that temperature. Preferred is an epoxy which is a polynuclear phenol-glycidyl ether or an aromatic polyglycidylamine each having a theoretical epoxy functionality of at least 2. Most preferred are the polynuclear phenol-glycidyl ether-derived resins such as HPT 1071 and 1072 which can be cured at a temperature below about 100° C., with MPDA, or other epoxy-curing-agent.

The amount of epoxy-curing-agent used will affect both the rate and temperature at which the epoxy will cure, as well as the viscosity of the resin system. After second stage curing, it also affects the upper service temperature of the cured resin blend. In general, from about 10 to about 50 parts of curing agent per 100 parts or from about 1 to about 40 mol percent, of epoxy is adequate for the purpose at hand.

As expected, the amount of epoxy-reactive diluent used also affects both the rate and temperature at which the epoxy will cure, as well as the viscosity of the resin system. After second stage curing, it also affects the upper service temperature of the cured resin blend, particularly if the reactive diluent has a functional group which can react with the APB-BMI, as is the case with 3-APA. In general, from about 30 to about 100 parts of 3-APA per 100 parts of epoxy is adequate for the purpose at hand.

As will also be expected, the amount of APB-BMI used affects the viscosity of the resin system, ranging from about 260 cp when there is about twice as much APB-BMI as there is epoxy in the system, to about 21,000 cp when there is about 25 times more APB-BMI than epoxy and only about 30 parts of 3-APA in the system. After second stage curing, the proportion of APB-BMI to epoxy in the cured blend determines the upper service temperature of the blend. In general, from about 30 to about 100 parts of 3-APA per 100 parts of epoxy is adequate for the purpose at hand.

B. 100 parts HPT 1072, 30 parts MPDA and 30 parts of APA are thoroughly mixed at room temperature (about 20° C.) to form a first mixture to which is added 500 parts of APB-BMI with continued mixing and without heating, so as to form a homogeneous second mixture in which the HPT 1072/-MPDA/APA/APB-BMI are present as a single phase. This second mixture is then warmed to about 38° C. (100° F.) and allowed to cure, forming a solid mass in which the APB-BMI is homogeneously distributed without being crosslinked. The solid mass is then placed in an autoclave and the temperature raised to 190° C. (374° F.) and held at this temperature for 1 hour. The shape of the solid mass is substantially retained and the APB-BMI is found to be essentially completely crosslinked, without evidence of HPT 1072 bleeding to the surfaces. The resin density after 5 hr at 121° C., measured with a Helium pycnometer, is about 1.24 g/cm$^3$, and upon post-curing to a more complete cure, the density is 1.20 g/cm$^3$.

C. 500 parts of APB-BMI and 50 parts of APA are thoroughly mixed at room temperature (about 20° C.) to form a first mixture to which is added 100 parts HPT 1072 and 30 parts MPDA with continued mixing and without heating, so as to form a homogeneous second mixture in which the HPT 1072/APB-BMI/APA are present as miscible liquids forming a single phase. As in part A hereinabove, this second mixture is then processed as before, namely being warmed to 38° C. and allowed to form a solid mass which is then placed in an autoclave and cured at 190° C. Again, the shape of the solid mass is substantially retained and the APB-BMI is found to be essentially completely crosslinked, without evidence of HPT 1072 bleeding to the surfaces.

In a manner analogous to that described hereinabove mixtures are formed with STI-BMI (Ciba-Geigy) using 3-APA as the diluent and a variety of liquid curing agents for the epoxy known to provide the cured epoxy with good high temperature performance.

In each of the foregoing BMIs, up to about 25 parts of APB-BMI or STI-BMI are used for each part of HPT 1071 or HPT 1072 epoxy, using correspondingly, progressively increasing amounts of 3-APA, up to equal parts of 3-APA and epoxy by weight, to form a single liquid phase with each BMI. The initial first stage curing is readily effected at a temperature below about 80° C. (176° F.), and the second stage curing may be effected at a temperature substantially above 121° C. (250° F.), and this second stage curing temperature may be increased as the concentration of BMI increases.

Example 2

A prepreg tape, 5 mil thick, of unidirectionally laid, high modulus graphite continuous fibers (IM6 obtained from Hercules) is essentially fully impregnated with the second mixture formed in example 1B hereinabove. Eight plies of this tape were placed between caul plates at 100 psig (1487 kPa) and cured at 20° C. for 2 hr, then placed in a vented autoclave and cured at 140° C. (300° F.) for 2 hr, removed and cooled to 20° C. under pressure. The density of a composite consisting essentially of 60% fiber by volume, and 67% fiber by weight, with 0.06% voids, is 1.52 g/cm³. The weight loss at 177° C. (350° F.) is less than 0.25% after 200 hr.

Typical mechanical properties of the cured tape composites nominally about 0.5" wide and 0.04" thick, each measured at different temperatures, are provided in the following Table 1:

TABLE 1

| Sample identif. | Test Temp. °F. | Load lb. | Flex strength ksi* | Modulus msi** |
|---|---|---|---|---|
| A | 70 | 101.5 | 163.7 | 14.32 |
| B | 350 | 92 | 149.2 | 13.37 |
| C | 450 | 69.5 | 103.3 | 12.37 |

*ksi = 10³ psi
**msi = 10⁶ psi

When fractured, scanning electron microscope micrographs of the fracture surfaces of all samples at 2000× magnification, show that there is cohesive failure, that is, the bonding interface of resin to fiber is so strong that the fibers are coated with resin indicating the failure is determined by the resin, not the strength of the resin-fiber bond at the interface.

Figure 2:
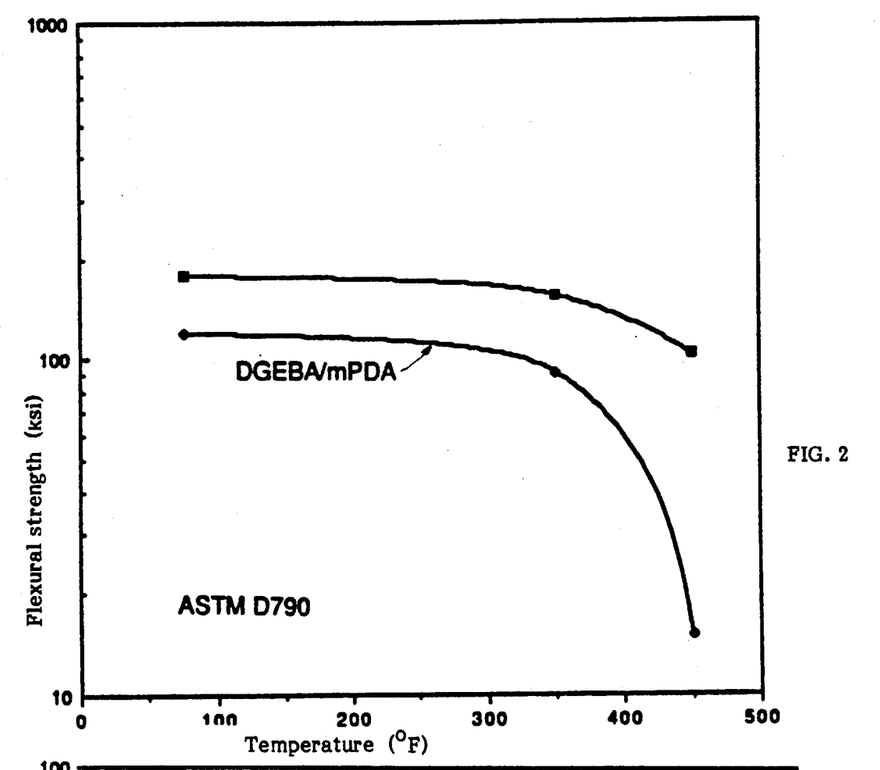
FIG. 2 is a comparison of the flexural strength (flex strength) of our resin with that of a currently used prior art epoxy resin (DGEBPA/MPDA), the comparison illustrated with a plot of flexural strength as a function of temperature, the measurements having been made with 8 ply laminates of unidirectional carbon fiber tape.
Figure 3:
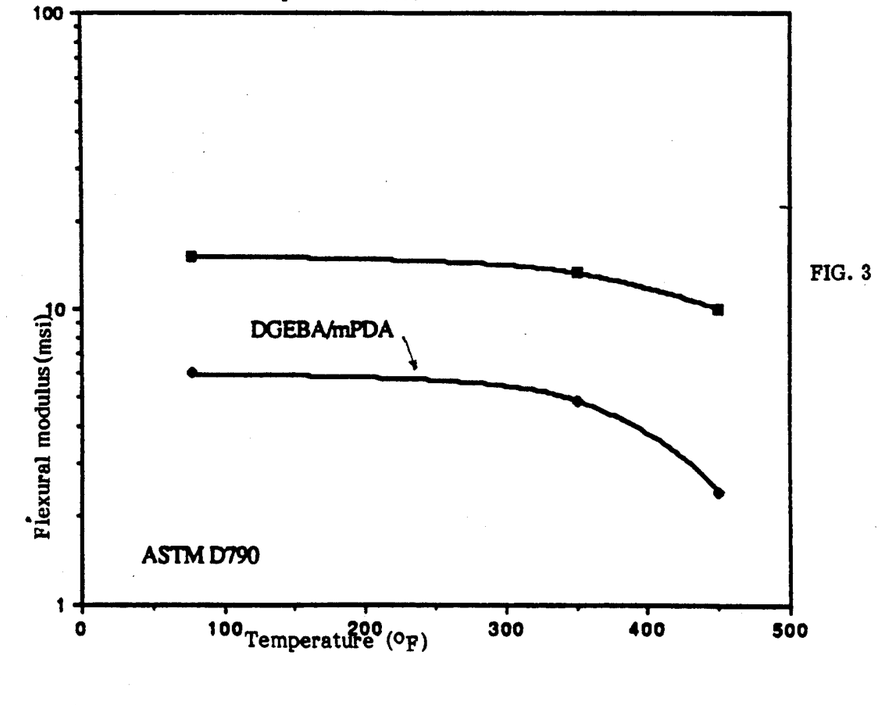
FIG. 3 is a comparison of flexural modulus (flex modulus) of our resin with that of DGEBPA/MPDA, the comparison illustrated with a plot of flexural modulus as a function of temperature, the measurements having been made with 8 ply laminates of unidirectional carbon fiber tape.

A comparison of flex strength and modulus of our composite with that of a like unidirectional 8-ply composite made in an analogous manner with carbon fibers impregnated with 100 parts diglycidyl ether of bisphenol A (DGEBPA) cured with 14 parts MPDA at 150° C. for 1 hr, indicates that the DGEBPA/MPDA composite has lower flex strength and modulus as a function of temperature, as shown in the curves plotted in FIGS. 2 and 3.

Differential scanning calorimeter analysis indicates a remarkable similarity between the DGEBPA/MPDA and our resin in that the curing reaction in each composite commences at about 100° C. and peaks at about 158° C. (317° F.).

Dynamic mechanical analysis of a carbon fiber composite with the 1B resin indicates two sharp transitions, the first at about 230° F., attributable to the epoxy, and the second at about 330° F., attributable to the BI. The sharp transitions corroborate the lack of chemical interaction between the epoxy and the BI. An analogous DMA curve for DGEBPA/MPDA shows a single transition at about 169° C.

Tests for water absorption indicate slight absorption, about 4.5% by wt, after being boiled in water for 48 hr.

The pot life of the resin 1B is measured by measuring viscosity as a function of time. At 200° F. the resin remains fluent for more than 4 hr. As expected, the pot life decreases with increasing temperature. The data at 120° C. (250° F.) are set forth herebelow in Table 2 and plotted in FIG. 1.

TABLE 2

Figure 1:
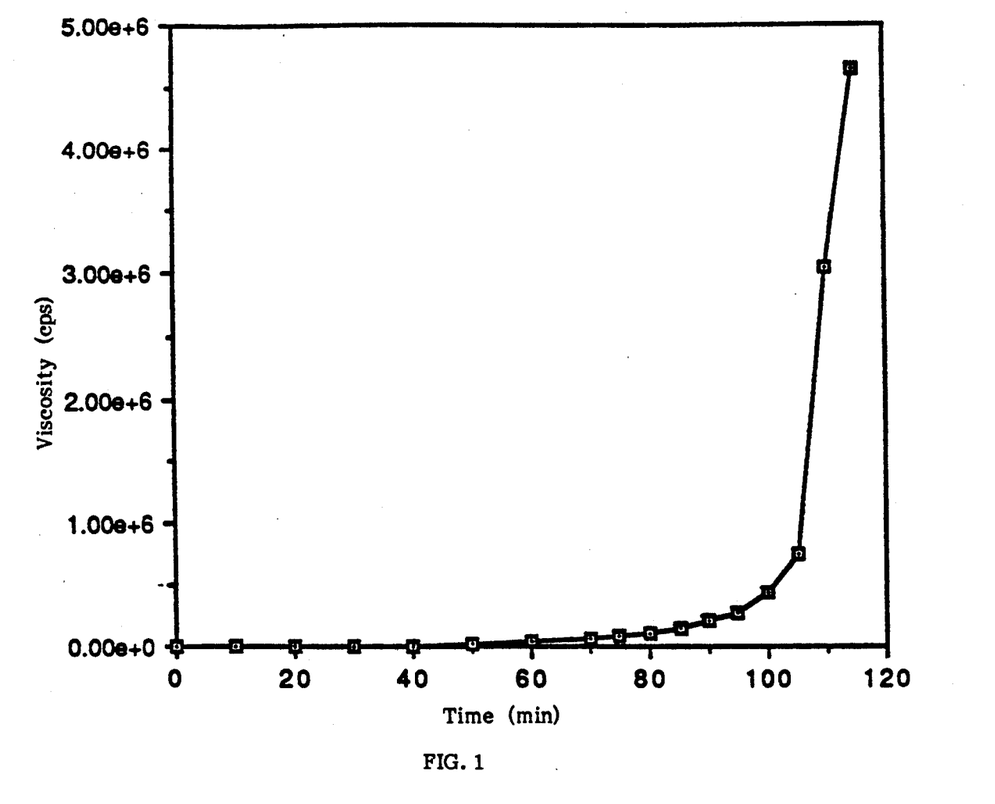
FIG. 1 is a plot of viscosity as a function of time, the viscosity measured at 120° C.

| Change of viscosity with time at 250° F. | |
|---|---|
| Time (min) | Viscosity (cps) |
| 0 | 1600 |
| 10 | 1600 |
| 20 | 1600 |
| 30 | 1600 |
| 40 | 7040 |
| 50 | 19200 |
| 60 | 34880 |
| 70 | 60800 |
| 75 | 78080 |
| 80 | 112000 |
| 85 | 154240 |
| 90 | 202880 |
| 95 | 263040 |
| 100 | 430400 |
| 105 | 742400 |
| 110 | 3049600 |
| 115 | 4652800 |

It will be evident from the curve in FIG. 1 that the viscosity does not begin to increase appreciably until after about 80 min, and that the viscosity begins a steep increase after about 100 min, allowing ample time for using the resin effectively.

We claim:

1. An essentially solvent-free cured resin blend consisting essentially of:
   (i) a polyimide curable at a temperature above about 150° C. (302° F.), and, having (a) plural imide groups connected to an aliphatic, cycloaliphatic, aromatic or heterocyclic radical having the same number of valences as there are imide groups, (b) a divalent radical containing from 2 to about 20 carbon atoms and a single C=C double bond;
   (ii) a liquid non-elastomeric epoxy having a molecular weight less than about 10,000, curable at a temperature below about 150° C.; and,
   (iii) an epoxy-curing-agent present in an amount sufficient to cure said epoxy into a polymeric matrix having a viscosity high enough to provide a stable three-dimensional structure which fixes the distribution of said polyimide within said matrix;
   said epoxy and epoxy-curing agent forming a continuous phase having a sufficiently low viscosity to form a single liquid phase in which said polyimide is miscible, and present in an amount sufficient to permit molecular interaction between polyimide molecules at a temperature higher than that required to cure said epoxy;
   whereby said epoxy is cured at a temperature below about 150° C. to provide said matrix; and said polyimide is thereafter cured at a temperature above about 150° C. to yield said cured resin blend.

2. The cured resin blend of claim 1 wherein said polyimide is a N,N'-bisimide curable at a temperature above about 150° C. (302° F.), represented by the structure:

wherein, Y represents a divalent radical containing from 2 to about 20 carbon atoms containing a C=C double bond, and, Z' is a divalent aliphatic, cycloaliphatic, aromatic or heterocyclic radical; and, said epoxy and epoxy-curing agent form a continuous phase having a sufficiently low viscosity to form a fluidized dispersion in which said N,N'-bisimide is substantially homogeneously dispersed as the disperse phase in an amount sufficient to permit interaction between contiguous N,N'-bisimide moieties at a temperature higher than that required to cure said epoxy;

whereby said epoxy is cured at a temperature below about 150° C. to provide said matrix; and said N,N'-bisimide is thereafter cured at a temperature below that at which said epoxy loses 50% of the values characterizing its physical and mechanical properties when conventionally cured, so as to yield said cured resin blend.

3. The cured resin blend of claim 2 wherein said epoxy is present in a minor amount by weight relative to said N,N'-bisimide.

4. The cured resin blend of claim 3 wherein said epoxy-curing-agent is present in an amount in the range from about 1 to about 40 mol percent, based on the number of moles of said epoxy present.

5. The cured resin blend of claim 4 wherein said epoxy-curing-agent is selected from the group consisting of an aromatic amine, and, a catalytic curing agent.

6. The cured resin blend of claim 5 post-cured at a temperature above about 176° C. (350° F.)

7. The cured resin blend of claim 3 wherein said epoxy is selected from the group consisting of a polynuclear phenol-glycidyl ether and an aromatic polyglycidylamine, each having a theoretical epoxy functionality of at least 2.

8. The cured resin blend of claim 3 wherein said N,N'-bisimide has a melting point below 150° C. (302° F.).

9. The cured resin blend of claim 4 wherein said epoxy-curing-agent is an aromatic polyamine having at least 3 active hydrogen atoms per molecule, and the amount of said curing agent is such that there are about 0.75 to about 1.25 amine hydrogen equivalents for each epoxy group.

10. The cured resin blend of claim 6 wherein Y represents a divalent radical containing 2 carbon atoms connected with a double bond so that said N,N'-bisimide is a bismaleimide.

11. The cured resin blend of claim 10 wherein said divalent aromatic radical is a polyarylene polyether.

12. The cured resin blend of claim 11 wherein said polyarlyene polyether is a polyphenylene polyether and said curing agent is m-phenylene diamine.

13. An essentially solvent-free cured resin blend consisting essentially of:

(i) a major proportion by weight of a N,N'-bisimide curable at a temperature above about 150 ° F. (302° F.), represented by the structure:

wherein, Y represents a divalent radical containing from 2 to about 20 carbon atoms containing a C=C double bond, and, Z' is a divalent aliphatic, cycloaliphatic, aromatic or heterocyclic radical;

(ii) from 1 to about 30 percent by weight of a multifunctional arylene epoxy-reactive diluent having vinyl or ethynyl unsaturation, said vinyl unsaturation effectively coupling epoxy groups at a temperature below 150° C. (302° F.), and said ethynyl unsaturation effectively reacting with said C=C double bond, and with other ethynyl bonds at a temperature above 150° C. by addition polymerization;

(iii) from 5 to about 45 percent by weight of a non-elastomeric epoxy resin having a molecular weight less than about 10,000, capable of forming a dispersive phase;

(iv) from 5 to about 80 parts by weight of an aromatic amine epoxy-curing-agent per 100 parts by weight of said epoxy resin, to cure said epoxy into a polymeric stable three-dimensional matrix having a sufficiently high viscosity to stabilize the distribution of said N,N'-bisimide within said matrix at about 150° C.;

said N,N'-bisimide, epoxy resin, epoxy-curing-agent and epoxy-reactive diluent forming a single liquid phase in which said N,N'-bisimide is substantially homogeneously dispersed;

whereby said epoxy resin is cured in a first stage at a temperature below about 150° C. to provide said matrix, and said N,N'-bisimide is thereafter cured at a temperature above about 150° C. but below that at which said epoxy loses 50% of the values characterizing its physical and mechanical properties when conventionally cured, so as to yield said cured resin blend.

14. The solvent-free cured resin blend of claim 13 wherein said N,N'-bisimide is a liquid at a temperature below 150° C., and is present in an amount from about 50 to about 80 parts per 100 parts by weight of said cured resin blend.

15. The solvent-free cured resin blend of claim 14 wherein said N,N'-bisimide is N,N'-bismaleimide.

16. A composite comprising from about 20 to about 50% by weight of an essentially solvent-free cured resin blend consisting essentially of:

(i) a N,N'-bisimide curable at a temperature above about 150° C. (302° F.), represented by the structure:

wherein, Y represents a divalent radical containing from 2 to about 20 carbon atoms containing a C=C double bond, and, Z' is a divalent aliphatic, cycloaliphatic, aromatic or heterocyclic radical;

(ii) a liquid non-elastomeric epoxy having a molecular weight less than about 10,000, curable at a temperature below about 150° C.; and,

(iii) an epoxy-curing-agent present in an amount sufficient to cure said epoxy into a polymeric matrix having a viscosity high enough to fix the distribution of said N,N'-bisimide within said matrix;

said epoxy and epoxy-curing agent forming a continuous phase having a sufficiently low viscosity to form a fluidized dispersion in which said N,N'-bisimide is substantially homogeneously dispersed as the disperse phase in an amount sufficient to permit interaction between contiguous N,N'-bisimide moieties at a temperature higher than that required to cure said epoxy;

whereby said epoxy is cured at a temperature below about 150° C. to provide said matrix; and said N,N'-bisimide is thereafter cured at a temperature below that at which said epoxy loses 50% of the values characterizing its physical and mechanical properties when conventionally cured, so as to yield said cured resin blend.

17. An essentially solvent-free cured resin blend consisting essentially of:

(i) a polyimide curable at a temperature above about 150° C. (302° F.), and, having (a) plural imide groups connected to an aliphatic, cycloaliphatic, aromatic or heterocyclic radical having the same number of valences as there are imide groups, (b) a divalent radical containing from 2 to about 20 carbon atoms and a single C=C double bond; wherein said polyimide is a N,N'-bisimide represented by the structure wherein, Y represents a divalent radical containing from 2 to about 20 carbon atoms containing a C=C double bond, and, Z' is a divalent aliphatic, cycloaliphatic, aromatic or heterocyclic radical; and, an epoxy-reactive diluent selected from the group consisting of a divinyl-arylene chain extender, an aliphatic or cycloaliphatic diol, aminophenylacetylene, and, the esterification product of a monoolefinically unsaturated carboxylic acid;

(ii) a liquid non-elastomeric epoxy having a molecular weight less than about 10,000, curable at a temperature below about 150° C.; and,

(iii) an epoxy-curing-agent present in an amount sufficient to cure said epoxy into a polymeric matrix having a viscosity high enough to provide a stable three-dimensional structure which fixes the distribution of said polyimide within said matrix;

said epoxy and epoxy-curing agent forming a continuous phase having a sufficiently low viscosity to form a single liquid phase in which said polyimide is miscible, and present in an amount sufficient to permit molecular interaction between polyimide molecules at a temperature higher than that required to cure said epoxy;

wherein said epoxy is cured at a temperature below about 150° C. to provide said matrix; and said N,N'-bisimide is thereafter cured at a temperature below that at which said epoxy loses 50% of the values characterizing its physical and mechanical properties when conventionally cured, so as to yield said cured resin blend.

18. An essentially solvent-free cured resin blend consisting essentially of:

(i) a polyimide curable at a temperature above about 150° C. (302° F.), and, having (a) plural imide groups connected to an aliphatic, cycloaliphatic, aromatic or heterocyclic radical having the same number of valences as there are imide groups, (b) a divalent radical containing from 2 to about 20 carbon atoms and a single C=C double bond; wherein said polyimide is a N,N'-bisimide curable at a temperature above about 150° (302° F.), represented by the structure:

wherein, Y represents a divalent radical containing from 2 to about 20 carbon atoms containing a C=C double bond, and, Z' is a divalent aliphatic, cycloaliphatic, aromatic or heterocyclic radical; and, (ii) a liquid non-elastomeric epoxy having a molecular weight less than about 10,000, curable at a temperature below about 150° C.; and, (iii) an epoxy-curing-agent present in an amount sufficient to cure said epoxy into a polymeric matrix having a viscosity high enough to provide a stable three-dimensional structure which fixes the distribution of said polyimide within said matrix;

said epoxy and epoxy-curing agent forming a continuous phase having a sufficiently low viscosity to form a fluidized dispersion in which said N,N'-bisimide is substantially homogeneously dispersed as the disperse phase in an amount sufficient to permit interaction between contiguous N,N'-bisimide moieties at a temperature higher than that required to cure said epoxy;

whereby said epoxy is cured at a temperature below about 150° C. to provide said matrix; and said N,N'-bisimide is thereafter cured at a temperature below that at which said epoxy loses 50% of the values characterizing its physical and mechanical properties when conventionally cured, so as to yield said cured resin blend.

* * * * *